United States Patent
Wang et al.

(10) Patent No.: US 7,395,593 B2
(45) Date of Patent: Jul. 8, 2008

(54) METHOD OF APPLYING OUTER INSULATION TO A STATOR BAR OF AN ELECTRIC MACHINE

(75) Inventors: Yu Wang, Clifton Park, NY (US); Martin Kin-Fei Lee, Niskayuna, NY (US); Patricia Chapman Irwin, Altamont, NY (US); Hsin-Pang Wang, Rexford, NY (US)

(73) Assignee: General Electric Company, Schenectady, NY (US)

( * ) Notice: Subject to any disclaimer, the term of this patent is extended or adjusted under 35 U.S.C. 154(b) by 442 days.

(21) Appl. No.: 10/908,005

(22) Filed: Apr. 25, 2005

(65) Prior Publication Data

US 2005/0204543 A1 Sep. 22, 2005

Related U.S. Application Data

(62) Division of application No. 10/605,489, filed on Oct. 2, 2003, now Pat. No. 7,026,554.

(51) Int. Cl.
*H02K 15/00* (2006.01)
(52) U.S. Cl. .................. 29/596; 29/598; 29/603.25; 156/244.11; 156/244.12; 174/120 R; 277/534
(58) Field of Classification Search .............. 29/596, 29/598, 603.25; 156/244.11, 244.12; 174/120 R; 277/534
See application file for complete search history.

(56) References Cited

U.S. PATENT DOCUMENTS 2,464,653 A * 3/1949 Phipps ................... 277/534
4,909,638 A * 3/1990 Muto .................... 384/273

FOREIGN PATENT DOCUMENTS

GB 1432214 * 4/1976

* cited by examiner

*Primary Examiner*—A. Dexter Tugbang
*Assistant Examiner*—Thiem Phan
(74) *Attorney, Agent, or Firm*—Hartman & Hartman, PC; Gary M. Hartman; Domenica N. S. Hartman

(57) ABSTRACT

A method of applying an outer insulation to a stator bar to form an insulated stator bar. The method entails extruding at least one extruded member that will form the outer insulation. The extruded member has an opposing pair of edges that are parallel to the longitudinal length of the extruded member. The extrusion process creates an inner cavity that extends the longitudinal length of the extruded member. A bare stator bar is then inserted into the inner cavity of the outer insulation so that the outer insulation surrounds the perimeter of the bar and extends along a longitudinal length thereof. The edges of the extruded member are then attached together so that the perimeter of the bar is entirely enclosed by the extruded member.

11 Claims, 3 Drawing Sheets

METHOD OF APPLYING OUTER INSULATION TO A STATOR BAR OF AN ELECTRIC MACHINE

CROSS REFERENCE TO RELATED APPLICATIONS

This is a Divisional patent application of U.S. patent application Ser. No. 10/605,489, filed Oct. 2, 2003.

BACKGROUND OF THE INVENTION

This invention generally relates to electric insulation materials. More particularly, this invention is directed to an extruded groundwall insulation material for a stator bar of an electric machine and a process for applying the insulation material to the stator bar.

FIG. 1 represents an end portion of a stator (armature) bar 10 of the type installed in dynamoelectric machines, such as a generator used in power generation of high-voltage alternating current. The stator bar 10 can be manufactured to have essentially any length, shape and cross section appropriate for a given generator design, voltage, and power. For most high-voltage applications, the stator bar 10 will not have a simple linear shape, but instead will have a complex shape with bends and turns.

As shown, the stator bar 10 is composed of a number of conducting copper strands 12 that are insulated from each other by strand insulation 13. The strands 12 are arranged to form two tiers that are separated by a strand separator 14, all of which may together be termed a "bare bar." Surrounding the tiers is a stator bar (groundwall) insulation 15 formed by multiple wrappings of a mica paper tape 16. Typically multiple layers of tape are tightly wrapped around the conductor, usually overlapping by one-half the width of the tape, or "half-lapped." The groundwall insulation 15 serves to insulate the stator bar 10 from the stator in which it is installed.

Groundwall insulation of the type shown in FIG. 1 is widely used in the power generation industry. The mica paper tape 16 is a prepreg composed of a mica paper typically backed by a single woven backing or a pair of backings. A resin composition permeates the mica paper and bonds each backing to the mica paper, thereby forming the prepreg tape. Examples of this type of groundwall insulation include commonly-assigned U.S. Pat. No. 3,563,850 to Stackhouse et al., U.S. Pat. No. 5,618,891 to Markovitz, U.S. Pat. No. 6,043,582 to Markovitz et al., and U.S. Pat. No. 6,359,232 to Markovitz et al. After being wrapped with a sacrificial release film to protect the tape and prevent contamination, the stator bar 10 are placed in an autoclave for vacuum heat treatment and subsequent curing of its tape 16. Vacuum heat treatment is carried out to remove air, moisture and any solvent or volatile compound present in the resin binder of the tape 16 while curing under pressure serves to consolidate the tape insulation, such that the resin binder bonds the mica paper and each of its backings together to form a void-free solid insulation. Removal of air, moisture, solvents and volatile compounds from the binder is necessary to prevent formation of voids in the cured insulation that would otherwise adversely affect the quality of the insulation and induce premature insulation failure due to breakdown under electrical stress. The latter characteristic of insulation is termed "voltage endurance," and is normally due to erosion by electrical discharge and electrochemical attack.

It can be appreciated that groundwall insulation of the type described above is labor intensive and incurs significant process costs. Furthermore, if not properly controlled, the taping process can lead to the presence of voids, resulting in reduced performance reliability. Therefore, improved groundwall insulation and processes have been investigated. For example, extruded groundwall insulation has been proposed, examples of which include commonly-assigned U.S. Pat. No. 5,650,031 to Bolon et al. and U.S. Pat. No. 5,710,475 to Irwin et al. In these approaches, the bare stator bar is passed through an extrusion die, which deposits the groundwall insulation in-situ along the entire length of the bar. The technical challenges associated with extruded groundwall insulation, including the difficulty of passing stator bars with complex shapes through a die, have been significant, such that stator bars equipped with extruded insulation are not currently in production. Accordingly, there remains a demand for groundwall insulation that overcomes the shortcomings of groundwall insulation formed of multiple wrappings of mica paper tape.

BRIEF SUMMARY OF THE INVENTION

The present invention provides an insulated stator bar for an electric machine, and method of applying an outer insulation to a bare stator bar to form the insulated stator bar. The invention is particularly directed to groundwall insulation for stator bars used in dynamoelectric machines that operate at high voltages, such as a generator for power generation of alternating current delivered to a distribution network (e.g., typically in a range of about 13.8 to 1 g kV).

The outer insulation of this invention surrounds the perimeter of the stator bar and extends along a longitudinal length of the bar, preferably forming a void-free barrier surrounding the perimeter of the bar. The outer insulation comprises at least one extruded member (e.g., a single extruded member, two individual extruded members, etc.) containing an electrical insulation material. The at least one extruded member comprises an opposing pair of edges parallel to the longitudinal length of the bar. The edges are joined together so that the perimeter of the bar is entirely enclosed by the at least one extruded member.

The method of the present invention generally entails the steps of extruding the at least one extruded member that will form the outer insulation. The at least one extruded member comprises an opposing pair of edges that are parallel to the longitudinal length of the at least one extruded member. In addition, the extrusion process creates an inner cavity that extends the longitudinal length of the at least one extruded member. A bare stator bar is then inserted into the inner cavity of the outer insulation so that the outer insulation surrounds the perimeter of the bar and extends along a longitudinal length thereof. The opposing pair of edges of the at least one extruded member are then attached together so that the perimeter of the bar is entirely enclosed by the at least one extruded member.

A significant aspect of the present invention is that extruding and then assembling the outer insulation with a bare stator bar is simpler and less costly than prior art mica tape processes, as well as previous attempts to form an in-situ extruded insulation. Known processes such as thermoforming can be utilized to cause the insulation to conform to the outer perimeter of the bar, thereby enabling the forming of a void-free barrier surrounding the bar.

Other objects and advantages of this invention will be better appreciated from the following detailed description.

DETAILED DESCRIPTION OF THE INVENTION

Figure 1:
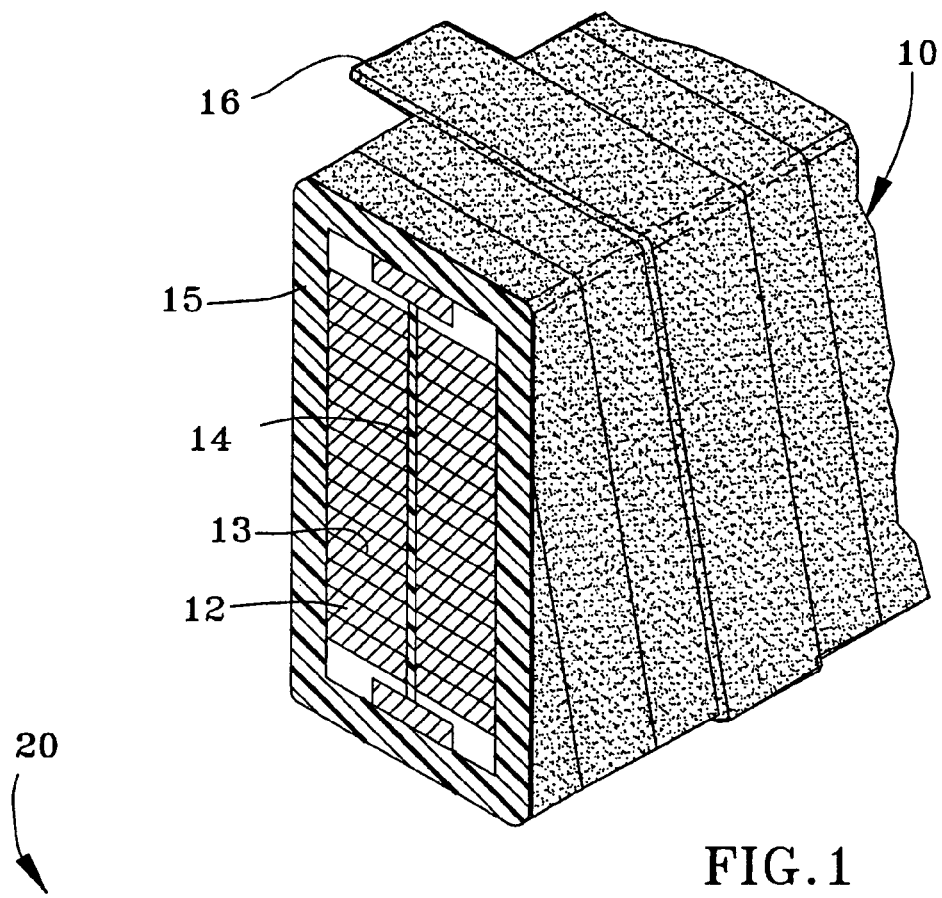
FIG. 1 shows in perspective a cross-section of a stator bar wrapped with a prepreg tape in accordance with the prior art.
Figure 2:
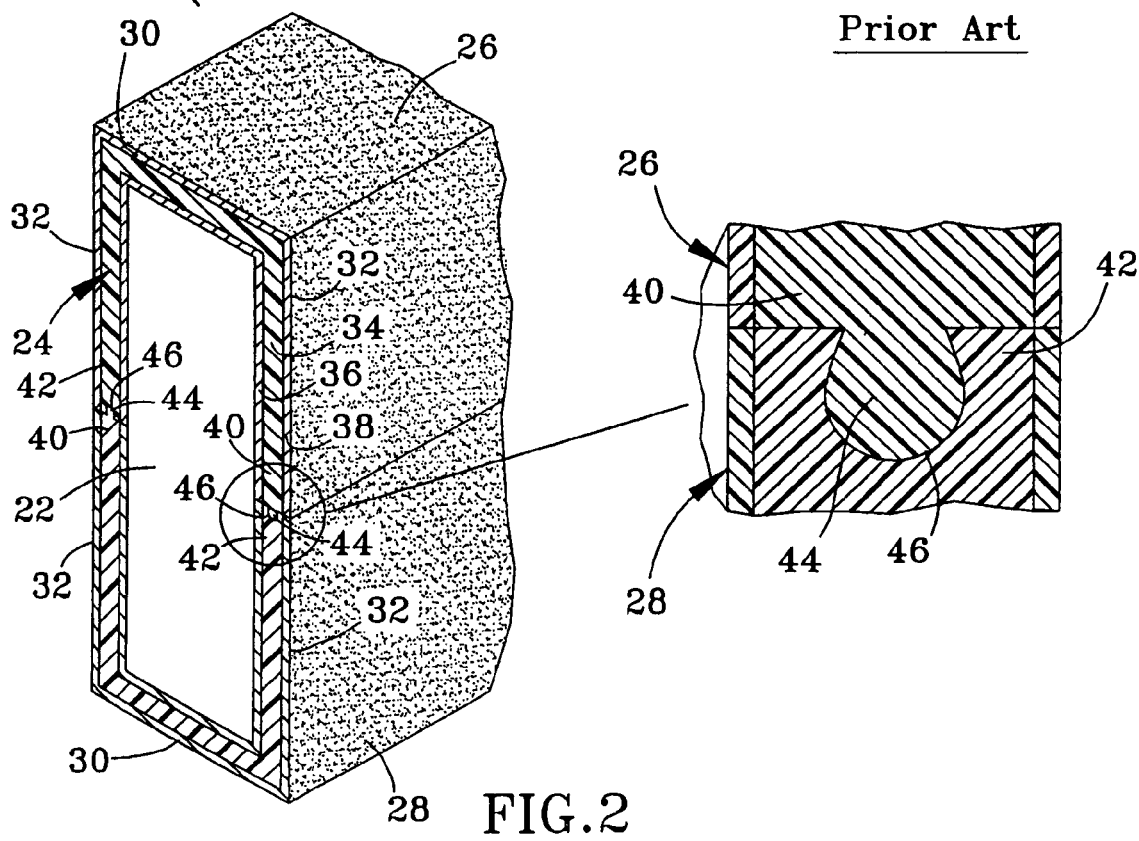
FIG. 2 is a perspective end view of a two-piece extruded insulation surrounding a stator bar in accordance with a first embodiment of the present invention.

FIG. 2 schematically represents a cross-sectional view of an insulated stator bar 20 for a generator of a type used in power generation of high-voltage alternating current delivered to a distribution or transmission network. The stator bar 20 includes stator bar (groundwall) insulation 24 surrounding a bare bar 22. The construction of the latter can be the same or similar to the bare bar (12, 13 and 14) of the stator bar 10 shown in FIG. 1, though any suitable bare bar construction is within the scope of this invention.

The stator bar 20 of FIG. 1 differs from the stator bar 10 of FIG. 1 with respect to the construction of its groundwall insulation 24. In contrast to the insulation 15 represented in FIG. 1 as being formed by multiple wrappings of a mica paper tape 16, the groundwall insulation 24 of FIG. 2 comprises two extruded members 26 and 28. Each extruded member 26 and 28 is generally C-shaped or U-shaped, which as used herein include the cross-sectional shapes of the extruded members 26 and 28 shown in FIG. 2, namely, a base 30 and two parallel sides 32 that are each perpendicular to the base 30. Such shapes can be readily extruded and then subsequently assembled with the bare bar 22 to result in the stator bar 20 shown in FIG. 2.

Each extruded member 26 and 28 is represented in FIG. 2 as having a multilayer construction that includes an electrical insulation layer 34 sandwiched between a pair of inner and outer layers 36 and 38, respectively. Suitable materials for the insulation layer 34 include electrometric and filled thermoplastic materials having sufficiently high electrical resistivity. An optional but preferred property for the insulation material is the ability to undergo thermoforming in order to more closely conform to the bar 22. Examples of suitable filled thermoplastic materials include polysulfones, polyimides, bismaleimides, cyanate esters, polysulfides, and silicones filled with about 1 to about 50 weight percent of ceramic and/or oxide particles. Suitable thicknesses for the insulation layer 34 will depend on the particular material from which it is formed.

The inner and outer layers 36 and 38 may be co-extruded with the insulation layer 34, or laminated or painted onto the insulation layer 34 after extrusion. Suitable materials for the inner and outer layers 36 and 38 include various conductive materials, such as those used to form conductive slot armoring and internal grading for stator bar groundwall insulation. The presence of the conductive inner and outer layers 36 and 38 is optional, but can be beneficial to allow small relative motions between the conductors and the insulation layers of the bare bar 22 and to reduce any electrical stresses induced at the interface between the bar 22 and insulation 24. Alternatively or in addition, thin semiconductive tapes may be applied inside and/or outside the extruded insulation layer 34. Suitable thickness for the layers 36 and 38 will depending on the particular materials of which they are formed.

As evident from FIG. 2, each extruded member 26 and 28 has a pair of edges 40 and 42, each opposing pair of which are shown as have complementary interlocking features 44 and 46. The features 44 and 46 are represented as interlocking tongue and grooves 44 and 46 in FIG. 2 though other configurations are possible, such as butt joints, lap joints, etc. The interlocking features 44 and 46 serve to mechanically lock together the opposing edges 40 and 42 of the extruded members 26 and 28. The interlocking features 44 and 46 are preferably continuous along the entire length of their respective extruded member 26 or 28, though it is foreseeable that the features 44 and 46 could be discontinuous.

As noted above, the C-shaped cross-section of the members 26 and 28 facilitate forming the members 26 and 28 by extrusion. A suitable extrusion technique would be a profile extrusion technique, by which the different layers of materials are co-extruded with multiple extrusion machines feeding into a specially-designed die head. After assembly of the extruded members 26 and 28 with the bar 22, members 26 and 28 formed of a thermoplastic material may undergo a thermoforming operation, in which both heat and pressure are applied to the extruded members 26 and 28 to soften the members 26 and 28, force the members 26 and 28 to closely conform to the exterior perimeter of the bar 22, and close gaps and voids between the extruded members 26 and 28 and the bar 22. Thermoforming can also result in a more dense material by reducing any porosity within the extruded members 26 and 28 in the unlikely event that such defects are formed during the extrusion process. Suitable thermoforming techniques and parameters will depend on the particular materials used to form the extruded members 26 and 28, and would generally be within the skill of those familiar with thermoforming processes.

Figure 3:
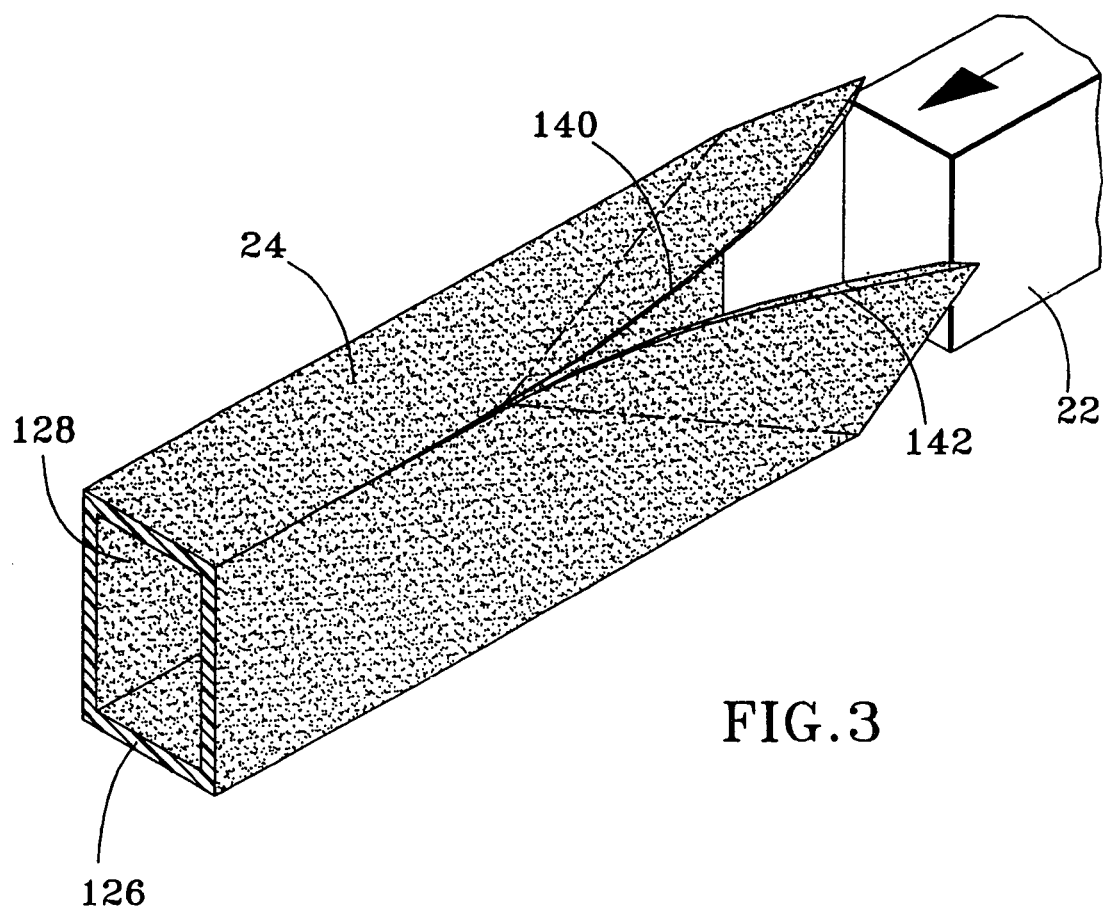
FIGS. 3 and 4 are perspective views showing stator bars being inserted into one-piece extruded insulation in accordance with second and third embodiments of the invention.
Figure 4:
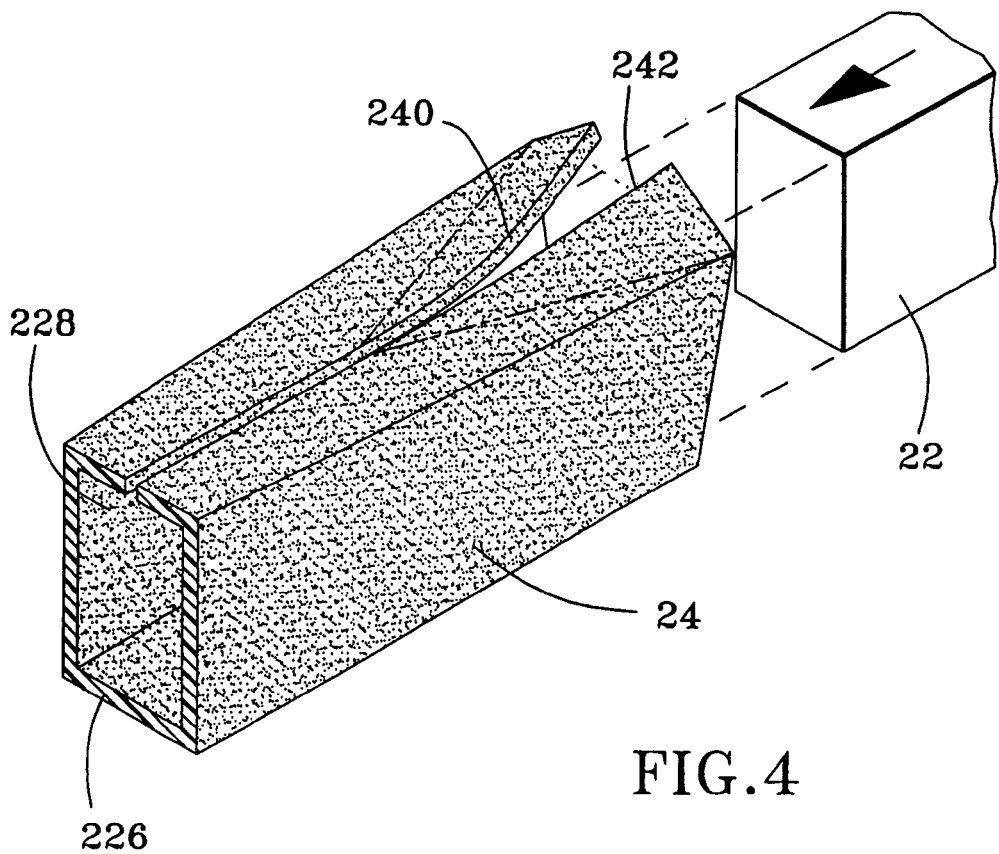

FIGS. 3 and 4 represent alternative embodiments of the insulation 24 of FIG. 2, as well as techniques for their assembly with a bare bar 22. In FIG. 3, the insulation 24 is formed by a single extruded member 126 having a rectangular shape that defines a central passage 128 and a single pair of opposing edges 140 and 142 located at one of the corners of the rectangular shape. FIG. 4 also shows the insulation 24 as formed by a single extruded member 226 having a rectangular shape that defines a central passage 228, but with a single pair of opposing edges 240 and 242 located along one of the sides of the rectangular shape. In the embodiments of FIGS. 3 and 4, the edges 140/142 and 240/242 can be joined together by welding or with interlocking features (not shown) during or following insertion of the bar 22 into their passages 128 and 228.

Figure 5:
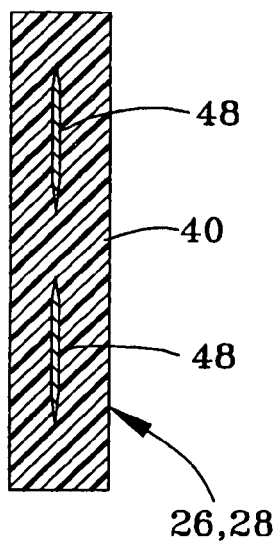
FIGS. 5 and 6 are partial end and plan views, respectively, of an embodiment in which mechanical supports are inserted into opposing edges of an extruded insulation to strengthen the joint formed by and between the edges in accordance with a fourth embodiment of this invention.
Figure 6:
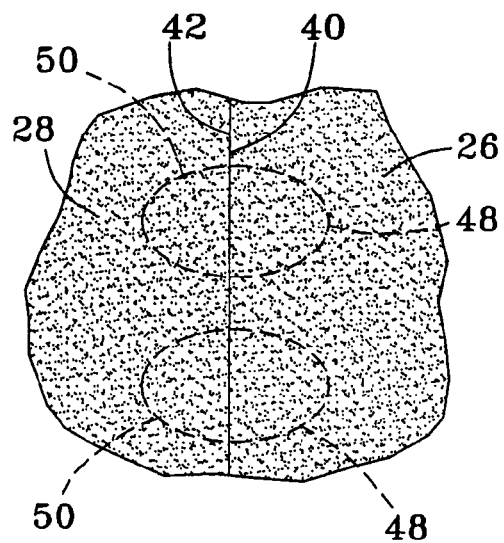

FIGS. 5 and 6 represent features that can be incorporated into any one of the embodiments of FIGS. 2 through 4 to mechanically secure together the edges 40, 42, 140, 142, 240, and 242 of the extrusion members 26, 28, 126 and 128. FIG. 5 represents a portion of the edge 40 of one of the extruded members 26 and 28 of FIG. 2, modified to have a pair of slots 48 formed therein. FIG. 6 is a plan view showing the seam defined by opposing edges 40 and 42 of the extruded members 26 and 28, in which each edge 40 and 42 has been modified to include opposing pairs of slots 48 of the type represented in FIG. 5. FIG. 6 further represents the presence of pegs 50 received in the opposing pairs of slots 48. An interference fit between the pegs 50 and slots 48 creates a mechanical interlocking effect between the opposing edges 40 and 42 of the extruded members 26 and 28. The interlocking effect can be supplemented by welding the edges 40 and 42 together, as discussed previously.

Figure 7:
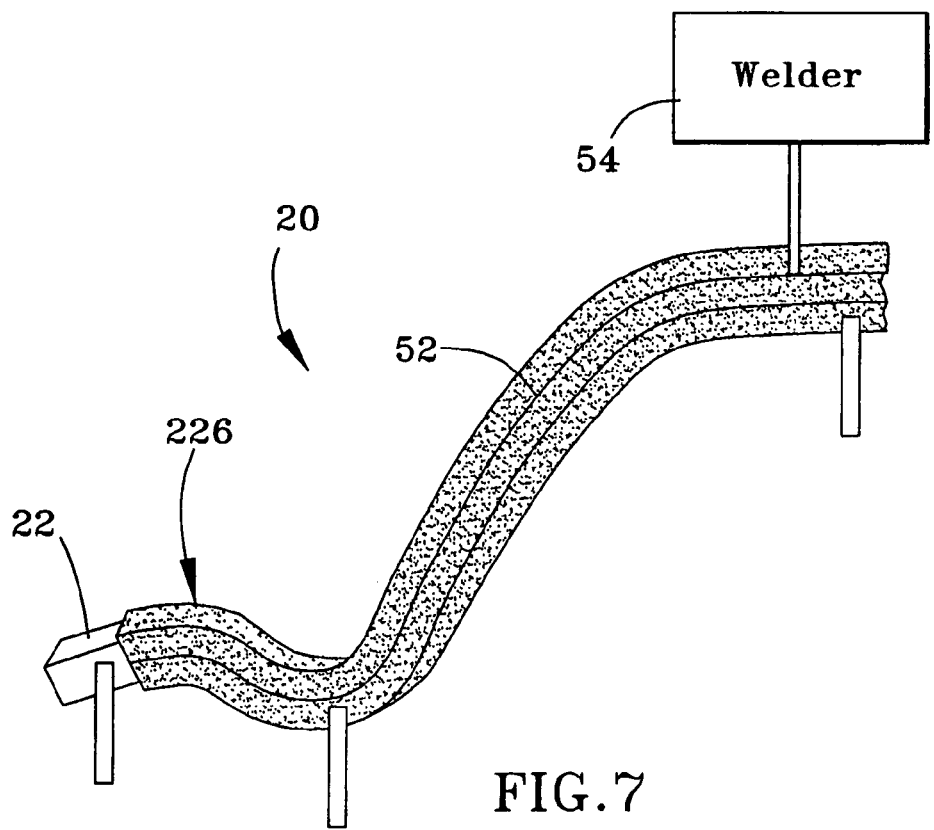
FIG. 7 represents a process for welding the abutting edges of an extruded insulation in accordance with the invention.

A weld can be used with or in lieu of interlocking features placed along the edges 40, 42, 140, 142, 240, and 242 of the extruded members 26, 28, 126, and 226. FIG. 7 represents an insulated stator bar 20 produced by the technique of FIG. 4 undergoing a welding operation, in which a weld 52 is being formed along the joint (located along one of the sides of the extruded member 226) using a plastic seam welding method. The weld material can be a filled or unfilled resin, suitable examples of which include those materials previously noted for the insulation layer 34. The welding process is schematically represented in FIG. 7 as being carried out with a movable weld head 54 and a fixtured stator bar 20. The weld head 54 is preferably carried on a multi-axis robotic arm (not shown) so that the weld 52 can be accurately formed along the length of the stator bar 20, which as depicted in FIG. 7 has a complex geometric shape.

While the invention has been described in terms of a preferred embodiment, it is apparent that other forms could be adopted by one skilled in the art. Accordingly, the scope of the invention is to be limited only by the following claims.

What is claimed is:

1. A method of applying an outer insulation to a stator bar for an electric machine, the method comprising the steps of:
   extruding the outer insulation to comprise at least one extruded member containing an electrical insulation material, the at least one extruded member having an inner cavity extending a longitudinal length thereof and an opposing pair of edges parallel to the longitudinal length thereof;
   inserting the stator bar into the inner cavity of the outer insulation so that the outer insulation surrounds a perimeter of the stator bar and extends along a longitudinal length thereof; and then
   attaching together the opposing pair of edges of the at least one extruded member so that the perimeter of the stator bar is entirely enclosed by the at least one extruded member;
   wherein the at least one extruded member is extruded so that slots are defined in each of the opposing pair of edges so that each slot of a first of the opposing pair of edges opposes a corresponding one of the slots of a second of the opposing pair of edges; and the attaching step comprises inserting a member in each pair of the opposing slots to mechanically secure together the opposing pair of edges.

2. The method according to claim 1, wherein the at least one extruded member is extruded so that the opposing pair of edges comprise interlocking features that physically secure the edges together as a result of the attaching step.

3. The method according to claim 1, wherein the attaching step comprises welding the opposing pair of edges together.

4. The method according to claim 1, wherein the at least one extruded member comprises a single extruded member that is extruded to define each of the opposing pair of edges.

5. The method according to claim 4, wherein the single extruded member is extruded to have a rectangular outer perimeter defining four corners and four sides therebetween.

6. The method according to claim 5, wherein the single extruded member is extruded so that the opposing pair of edges are located along one of the four corners of the outer perimeter of the single extruded member.

7. The method according to claim 5, wherein the single extruded member is extruded so that the opposing pair of edges are located on one of the sides of the outer perimeter of the single extruded member.

8. The method according to claim 1, wherein the at least one extruded member comprises two extruded members, each of the two extruded members being extruded to define a corresponding one of the opposing pair of edges.

9. The method according to claim 8, wherein each of the two extruded members is extruded to define a corresponding one of a second opposing pair of edges.

10. The method according to claim 8, wherein each of the two extruded members is extruded to be C-shaped.

11. The method according to claim 1, wherein the electrical insulation material of the at least one extruded member is chosen from the group consisting of electrometric and filled thermoplastic materials.

* * * * *